United States Patent [19]

Balon et al.

[11] 4,307,701
[45] Dec. 29, 1981

[54] PORTABLE HEAT DISTRIBUTION SYSTEM

[76] Inventors: Jack Balon, 22 Jefferson Rd., Bedford, N.H. 03102; Thomas H. Balon, 41 Lancelot Dr., Manchester, N.H. 03104

[21] Appl. No.: 143,556

[22] Filed: Apr. 25, 1980

[51] Int. Cl.³ ............................................. F24H 3/02
[52] U.S. Cl. ............................... 126/110 B; 98/40 C; 432/222
[58] Field of Search ........... 126/110 B, 110 C, 110 D, 126/110 E, 116 B, 116 A, 116 R, 105 A, 105 R, 204, 208; 432/222; 98/40 C, 50, 61, 62, DIG. 7; 239/273, 279, 547, 198; 138/119; 137/335.16; 431/281

[56] References Cited

U.S. PATENT DOCUMENTS

| | | | |
|---|---|---|---|
| 1,719,659 | 7/1929 | Hopkins | 98/40 C |
| 2,684,668 | 7/1954 | Culp et al. | 126/110 B |
| 2,966,347 | 12/1960 | Wolffradt | 432/222 |
| 3,050,111 | 8/1962 | Hubbard et al. | 432/222 X |
| 3,221,415 | 12/1965 | Murray | 126/110 B X |
| 3,302,549 | 2/1967 | Tibbitts et al. | 98/40 C X |
| 3,520,244 | 7/1970 | Gaines, Jr. | 98/40 C |
| 3,603,511 | 9/1971 | La Pierre | 239/547 X |
| 3,916,870 | 11/1975 | Beavers | 126/110 B |
| 3,948,246 | 4/1976 | Jenkins | 126/204 |

FOREIGN PATENT DOCUMENTS

| | | | |
|---|---|---|---|
| 1956659 | 6/1970 | Fed. Rep. of Germany | 98/40 C |
| 472234 | of 1952 | Italy | 432/222 |

*Primary Examiner*—Samuel Scott
*Assistant Examiner*—Randall L. Green
*Attorney, Agent, or Firm*—Weinstein & Sutton

[57] ABSTRACT

A portable heating unit comprising a heater and a low velocity blower, an elongated lightweight collapsible flexible heat carrying duct and an intermediate high velocity intake fan unit for mixing the low velocity heated air from said portable heater with ambient air and introducing the mixed air streams into the inlet end of said flexible duct. The intake fan unit includes a venturi for assuring adequate mixing of the air within the elongated flexible collapsible tube to provide a high velocity flow of air at a substantially constant temperature level along the length of the flexible tube. The tube is provided with a plurality of openings arranged in spaced intervals to eject high velocity jets of heated air at locations where they may be used most effectively.

The unit is designed to be positioned upon the ground and the remote end is sealed and preferably staked or otherwise held to the ground to prevent undue movement.

The diameter of the elongated flexible tube is selected to enable the tube to fit beneath a bench, preferably made of a metallic material to provide good heat conductivity. Openings are provided in the tube to emit air beneath the bench in order to heat the bench and thereby provide much needed warmth to persons sitting on the bench. Additional openings are arranged to emit the heated air at an angle chosen to direct the air toward the back part of the knees of persons sitting upon the bench. High velocity jets of heated air emitted from such openings may also be utilized as handwarming means for simultaneously warming the hands of a large group of persons in the vicinity of the tube by placement of the hands into the jets of heated air being emitted by said tube without danger of burning.

The lightweight collapsible nature of the apparatus greatly facilitate both assembly and disassembly as well as the transportability of the portable heating system.

19 Claims, 6 Drawing Figures

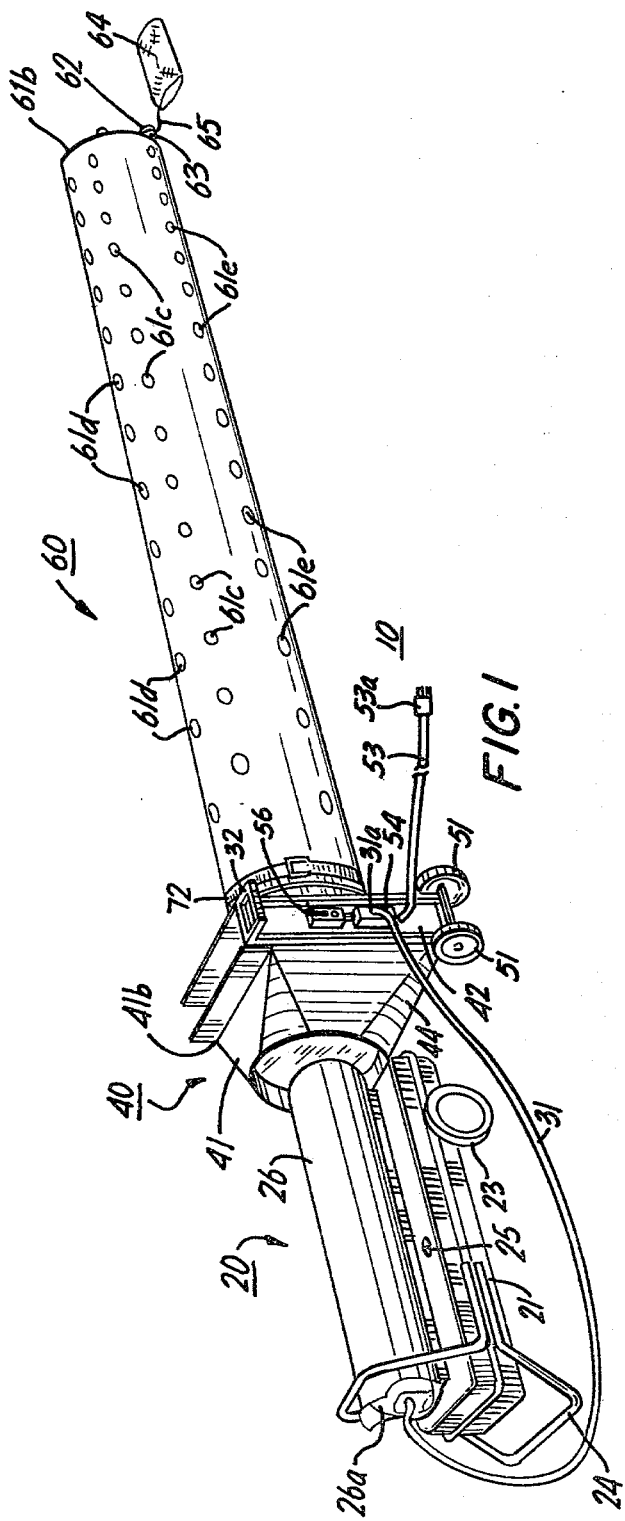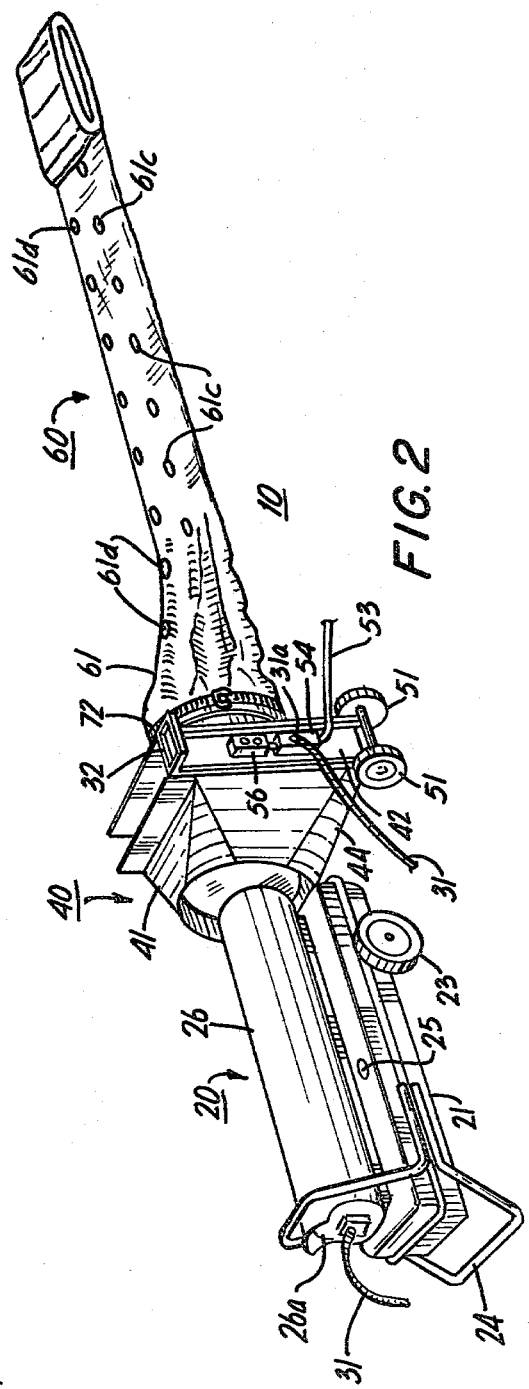

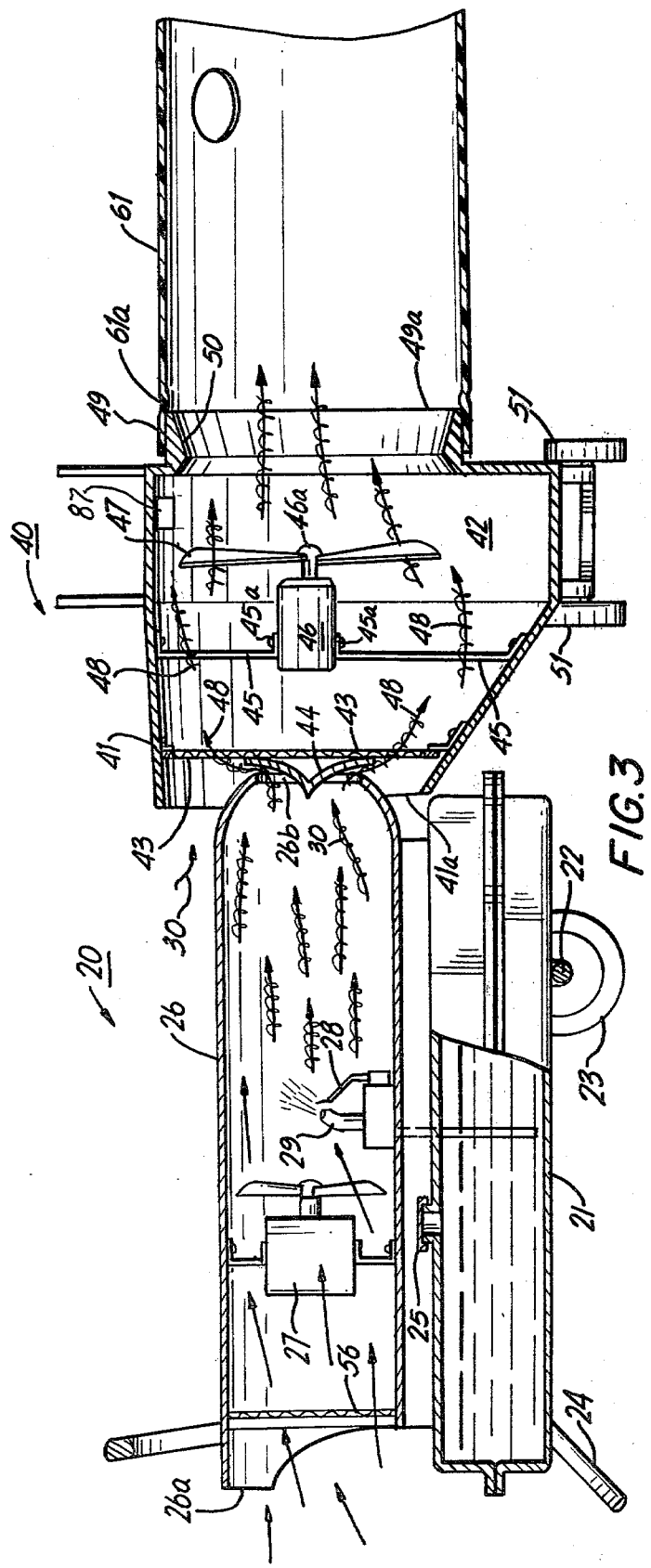

PORTABLE HEAT DISTRIBUTION SYSTEM

BACKGROUND OF THE INVENTION

The present invention relates to heating systems and more particularly to a novel portable heat distribution system for use in or out of doors and especially in cold climates or regions as a means for providing heat and warmth to a large group of people engaged in indoor or outdoor activities.

There are many activities which, although they may be performed quite comfortably during mild or even slightly cold climatic conditions, become quite uncomfortable and even distasteful when undertaken during severe climatic conditions, such as, for example, severe cold. Many activities are performed out of doors and, in fact, regardless of the prevailing weather conditions. For example, outdoor sports such as football, hockey, soccer and the like are quite frequently performed during the late fall, winter and early spring where climatic conditions and most particularly temperature levels are very severe, causing the players, as well as support personnel such as managers, coaches, referees, cheerleaders and the like, a significant amount of discomfort and possibly even conditions bordering upon frostbite or chilblain, for example. No suitable outdoor equipment exists which is both safe and capable of at least partially warming or reducing the chill experienced by persons who find it necessary to be out of doors for long periods of time to engage in their normal activities. Such activities are not confined to sports or recreation and, in fact, many people find it necessary to be out of doors or in poorly heated or unheated areas in connection with their work responsibilities such as outdoor construction, loading docks and unheated indoor areas, for example. The portable heaters presently available are not capable of warming more than two or three persons at the same time, and the heat generated by such units is more than sufficient to burn the body if the equipment is not used with extreme care.

The unit of the present invention may be used indoors as well as outdoors providing adequate ventilation is supplied. Indoor use may consist of warming groups of people in a shelter, providing a warming area on unheated loading docks, warming bleachers, etc. The unit may also be used to cure freshly poured concrete by distributing the heat more evenly over larger areas.

BRIEF DESCRIPTION OF THE INVENTION

The portable heat distribution system is comprised of a portable heater unit and a fan air distribution unit to which is attached a flexible, collapsible tube. Heat is dispensed by means of an elongated, flexible, large diameter collapsible tube formed of a rugged, preferably fiber-reinforced plastic material and having an inlet opening at a first end and being sealed at the opposite end. The fiber reinforced plastic material is adapted to be self-collapsing and may preferably be rolled up or otherwise folded to form a package which is quite small and compact, to facilitate transportation and storage when not in use. The air is delivered uniformly out of holes which are placed at specific desired locations along the length of the elongated flexible tube. A portable air intake unit is positioned between the oulet end of the heater unit and the inlet end of the collapsible unit. It is comprised of a tapered intake hood for receiving heated air from the heater unit, as well as ambient air and for delivering this mix of incoming air to a fan chamber having a rotatable fan unit positioned therein so that the axis of rotation of said fan unit is coaxial with the longitudinal axis of said intake hood and chamber. The motor for driving the fan is also positioned along the central axis of the metallic tube and has its output shaft coupled to the fan. The outlet end of the fan chamber communicates with a tube provided with a venturi to increase the velocity of the heated air introduced into the inlet end of the elongated flexible collapsible tube. The flexible tube, which collapses in the absence of air, is maintained in a substantially cylindrical configuration due to the high velocity air introduced into its inlet end.

The collapsible tube is provided with openings at spaced intervals, each opening providing a high velocity jet of heated air having great throwing power. The portable heat distribution system converts the high temperature, low velocity device, which is unsafe for heating personnel, to a high velocity, warm temperature heating unit, which is completely safe for use in warming personnel. The air discharge velocity varies with the length of tube, number, and size of holes, B.T.U. capacity of the heating unit being used and the temperature of the surrounding air.

In one preferred embodiment, the diameter of the flexible tube is selected so as to be slightly less than the height of a bench upon which players and other personnel normally sit, said tube having a length substantially equal to the length of the bench and a diameter enabling the collapsible tube to be positioned beneath the bench when filled with air. Some of the high velocity jets of heated air are directed toward the underside of the bench. The bench is preferably formed of a metallic material having good heat conductivity whereupon the high velocity jets of heated air serve to keep the bench warm at all times providing the people seated upon the bench excellent relief against the cold weather. Additional high velocity jets of heated air are preferably directed to strike the legs of persons seated upon the bench generally in the region behind the knee to provide further desirable heating and warmth. The openings are positioned along the collapsible tube to cause the high velocity jets of heated air to be emitted generally diagonally upward enabling persons positioning themselves near such openings to warm their upper body, face and hands providing comforting heat and warmth which serves to offset the unpleasant effects of the cold weather. The elongated collapsible tube may be positioned upon the ground at both indoor and outdoor locations other than beneath benches or other seating means to provide warmth to persons approaching the collapsible tube to warm those portions of the body positioned directly within the high velocity jets of heated air. The temperature of the jets of heated air is kept to a safe level due to the ambient air drawn into the air intake hood which reduces the heated air from the heater unit to a safe, usable level. The temperature of the jets of heated air may further be regulated by regulating the flow of fuel to the burner unit or by providing more or less heating coils (if an electric heater is used) and also by selectively energizing more or less of the total number of heating coils depending upon the particular climatic conditions which the outdoor heating system is designed to counteract. The closed, free end of the collapsible tube is preferably provided with a grommet or other suitable connecting member which may be tied or otherwise coupled to a stake or other anchoring member or weight for anchoring the aforesaid free end of the flexible tube against movement or undue shifting due to the constant flow of high velocity of air into the flexible tube and/or ambient wind currents. The size, direction and spacing of the holes in the flexible tube, together with the ratings of the fan and heater units, serve to regulate the velocity of the jets of heated air emitted from the collapsible tube and further assure that the tube remains substantially fully inflated. The air moving power of the fan and the cooperating venturi coupling the fan to the flexible tube are chosen to assure that air jets of sufficient velocity and temperature level are emitted from all openings along the length of the tube which may be as long as 200 feet. Units having a fifty foot tube length provide air jets of sufficient velocity using only a one-half horsepower motor. The tubes are preferably formed of a fiber reinforced polyolefin having an inflated diameter of the order of 18 inches.

OBJECTS OF THE INVENTION AND BRIEF DESCRIPTION OF THE FIGURES

It is, therefore, one object of the present invention to provide a novel portable heat distribution system for use in warming large groups of persons engaged in outdoor activities which are being performed in cold weather.

Still another object of the present invention is to provide a novel portable heat distribution system including an elongated lightweight flexible, collapsible and yet rugged tube preferably formed of a durable lightweight plastic material having openings at spaced intervals along said tube for emitting high velocity jets of heated air which may be utilized by persons engaged in cold weather activities for the purpose of warming one's hands as well as other portions of the body to reduce both the uncomfortable and the harmful effects of cold weather on the body.

The above as well as other objects of the present invention will become apparent when reading the accompanying description and drawings in which:

FIG. 1 shows a perspective view of a novel portable collapsible heat distribution system embodying the principles of the present invention.

Incorporated in FIG. 1 is a typical kerosene-fired heating unit. The heating system used could be of any make variety or capacity. If need be, the standard heating distribution system can be redesigned to meet the proper sizing of the heater to the distribution system.

FIG. 2 shows a perspective view of the embodiment of FIG. 1 in which the flexible tube is in the collapsed state.

FIG. 3 shows a simplified diagrammatic view of the portable system and heat distribution system of FIG. 1.

FIG. 4 shows an end view of the collapsible tube of FIGS. 1 and 2 positioned for use beneath a bench.

FIG. 5 shows a schematic diagram of the electrical system for the unit of FIG. 1.

FIG. 5a is a detailed perspective view of the electrical control portion of the system of FIG. 1.

DETAILED DESCRIPTION OF THE INVENTION

FIGS. 1 and 2 show a portable heating system 10 designed in accordance with the principles of the present invention and comprised of a heater module 20, an intake fan module 40 and a heat distributing tube module 60 shown in fully inflated form in FIG. 1 and shown in collapsed form in FIG. 2.

The heater module 20 is comprised of a fuel tank 21 which may, for example, store kerosene. The forward or righthand end of tank 21 is supported upon a carriage comprising an axle 22 (see FIG. 3) having a pair of wheels 23, only one such wheel being shown, which carriage facilitates the positioning and transportation of heater module 20.

A support bracket 24 is secured near the lefthand end of tank 21 and supports the lefthand end of tank 21 at an elevated position above the surface upon which the heater assembly 20 is supported, cooperating with wheels 23 to maintain fuel tank 21 and, hence, heater unit 20 substantially horizontally aligned.

Removal of fuel tank cap 25 permits replacement of depleted fuel.

An elongated substantially hollow cylindrical shell 26 is mounted upon fuel tank 21 and has an inlet opening 26a provided for the introduction of ambient air into the interior of hollow shell 26. Screen 56 prevents debris from entering into opening 26a. An intake fan unit 27 (FIG. 3) draws ambient air into intake opening 26a and moves the ambient air through a combustion chamber 28 containing a fuel nozzle 29 (note also FIG. 3) adapted to provide a fine spray of droplets of said fuel at the outlet of nozzle 29. An ignitor plug 29 provides an igniting spark for ignition of the fine fuel spray. The heater module 20 is of substantially conventional design and is commonly referred to as a "salamander" unit. The outlet end 26b of tube 26 delivers heated air at the rate of the order of 150,000 BTU's per hour and typically burns about one gallon of fuel per hour. The temperature of the air at the outlet end is usually of the order of 400° F. Conventional units of this type are used for a variety of applications such as, for example, drying concrete, as well as for warming personnel. These conventional units have also been used at the scene of outdoor sporting events for the purpose of warming players typically at the sidelines of a sporting contest, for example, such as a football game. Since the temperature of the heated air and outlet end 26b is of the order of 400° F., a person standing in close proximity to outlet end 26b or having any portion of the body within the flow of the heated air can suffer severe burns. Also, the flow of heated air is capable of warming at most two or three people at any given time. By utilizing the salamander unit 20 with the intake fan module 40 and the collapsible tube module 60 of the present invention, it is possible to warm as many as 20 to 30 persons at the same time and without the danger of being burned.

The intake fan module 40 is comprised of a rigid metallic housing assembly comprising an inlet hood 41 having an open inlet end 41a which surrounds outlet end 26b of salamander unit 20. The inlet hood 41 of the preferred embodiment tapers from an inlet end 41a having a circular opening of the order of one foot diameter and tapering outwardly to a 22 inch substantially square-shaped outlet end 41b which opens into a fan chamber 42. In one preferred embodiment, the inlet opening 41a has a one foot diameter while the inlet opening 26b of heater module 20 has a diameter of the order of eight inches, permitting a significant amount of ambient air to be continuously drawn into the open region between the openings 26b and 41a. The air at ambient temperature mixes with the heated air thereby significantly reducing the temperature of the jets of air expelled through the openings in collapsible tube module 60 in a manner to be more fully described.

Intake fan unit 40 includes a carriage comprised of wheels 51 and a gripping handle 32 to facilitate transportation and positioning of unit 40.

As shown best in FIG. 3, a protective screen 43 is fitted across inlet opening 41a of inlet hood 41 to prevent solid foreign matter from being drawn into the intake fan module 40. A nose cone 44 which is a substantially cone-shaped deflector 44 is positioned within inlet hood 41 and is secured to screen 43 by suitable bracket means (not shown). Support brackets 45 and 45a serve to support fan motor 46 within inlet hood 41 and behind nose cone deflector 44 so that the drive shaft 46a of fan motor 46 is coaxial with the central axis of intake fan module 40. A fan 47 is mounted upon output drive shaft 46a and is located within the substantially square-shaped fan chamber 42. Conical shape deflector 44 deflects air entering into inlet opening 41a around motor 46 as shown by arrows 48 in order to prevent motor 46 from being overheated due to the high temperature air being introduced into inlet hood 41 by salamander unit 20.

Motor 46 rotates fan 47 which draws in the heated air from heater unit 20 and ambient air and thoroughly and uniformly mixes the heated air delivered by salamander unit 20 with the ambient air. The intake fan unit 40, in addition to providing good uniform mixing of the ambient and heated air, delivers air through the outlet end of chamber 42 and through a cylindrical-shaped shell 49 having a venturi 50 which serves to further increase the velocity of air introduced into cylindrical shell 49 by fan 47. The air passing through the outlet end 49a of cylindrical shell 49 has a flow rate of the order of 3,000 cubic feet per minute.

The collapsible tube module 60 is comprised of an elongated collapsible tube made of a rugged and yet flexible material such as, for example, a fiber reinforced polyolefin formed in the shape of an elongated cylindrical tube 61. Inlet end 61a of tube 61 telescopes over the outlet end 49a of cylindrical shell 49. A clamping strap 72 secures the lefthand end of collapsible tube 61 to cylindrical shell 49.

The opposite free end 61b of collapsible tube 61 is sealed.

Tube 61 is provided with a first group of spaced openings 61c arranged substantially at a "two o'clock" position in order to provide exiting high velocity jets of heated air directed substantially diagonally upward. The flow rate of air introduced into tube 61 by means of fan 47 serves to maintain the otherwise collapsible tube 61 in an inflated substantially cylindrical-shaped configuration as shown best in FIG. 1.

Tube 61 may further be provided with a second group of openings 61d arranged at regularly spaced intervals and at a substantially "twelve o'clock" orientation for providing high velocity jets of heated air directed substantially vertically upward. The tube 61 may further be provided with a third group of openings 61e arranged substantially at a "four o'clock" orientation for the purpose of directing high velocity jets of air substantially diagonally downward.

The closed free end 61b of tube 61 is provided with a flap 62 having an eyelet 63. A bag 64 which may be formed of a rugged plastic or cloth and filled with sand or other similar pulverized material is secured to eyelet 63 by means of a short piece of rope 65 in order to prevent the free end 61b of tube 61 from shifting or moving when in use. However, in the event that the tube is struck by a significant force, the tube 61 is free to move without breaking or tearing.

In the embodiment shown in FIG. 1, tube 61 may, for example, be 50 feet long and may be positioned beneath a bench 68 (see FIG. 4) provided along the sidelines of an athletic field so that tube 61 is positioned between the legs 66 and 67 and below bench 68. The bench 68 is preferably formed of a metallic material having good thermal conductivity. Openings 61d direct high velocity jets of heated air against the underside of bench 68 which, due to its thermal conductivity properties, is heated to provide much needed warmth to persons sitting upon the bench in extremely cold weather. The openings 61c provide high velocity jets of heated air represented by arrow 70 which jets of air are arranged to strike the region of the back portion of the knees of the person sitting upon the bench.

Each opening 61e directs high velocity jets of air, represented by arrow 71, diagonally downward. An individual may place his or her foot within the high velocity air jet 71 to warm the feet or the toes of the feet. If desired, the toe of the foot may even be placed partially into the opening 61e. In actual use, field goal kickers have placed the toe of their foot into such openings in order to maintain the toe of the foot at a very comfortable temperature.

The total area of all of the openings 61c, 61d and 61e is preferably no greater than the area of the outlet opening of venturi 50 in order to satisfactorily maintain the collapsible tube fully inflated and to deliver jets of moving air having a velocity of the order of 3,000 feet per minute. In those embodiments in which the collapsible tube 61 has a length of the order of 50 feet, the temperature differential along the tube is such that openings in tube 61 closest to venturi 50 emit high velocity jets of air at a temperature of the order of 120° F. while those openings closest to sealed end 61b deliver high velocity jets of heated air to a temperature no less than 100° F. It can be seen that regardless of the positions of openings in tube 61 employed by persons desiring to warm their hands or other parts of the body that there is no danger whatsoever being burned. In addition, as many as 30 persons may stand beside the high velocity jets of heated air at the same time. The high velocity movement of the air jets has been found to more than compensate for the reduced temperature of the heated air jets to provide excellent warming to persons using the system 10.

The collapsible tube 61 poses no danger to persons who may accidentally step upon the tube 61 or fall upon the tube 61 since the tube 61 will freely collapse under the weight of a person's foot or body and will simply reinflate when the body or portion of the body is lifted off tube 61. Longer or shorter lengths of tube 61 may be utilized if desired. For example, one preferred embodiment for use by cheerleaders employs a tube length of the order of 20 feet positioned at any suitable location adjacent to the playing field. The tube 61 need not be placed beneath the bench 68 and will be retained in close proximity to the ground since tube 61 is secured to the cylindrical shell 49 by means of clamping strap 72 and has its opposite end secured to a suitable weight such as sand bag 64. The shorter length of tube 61 has a smaller temperature differential between its inlet and outlet ends as compared with the 50 foot tube length described hereinabove. Duct tape may be substituted for clamping strap 72, if desired.

Fan intake unit 40 is coupled to a remotely located suitable power source by means of an elongated power cord 53 having a plug 53a at its free end. Intake fan unit 40 includes a junction box 54 with a plug receptacle 54a for receiving the plug 31a of power cord 31 for powering heater unit 20. A control panel 56 is coupled to power cord 53 through receptacle 54 and cord 57.

The heat distribution unit's electrical circuit is shown in FIG. 5 and comprises an off switch 82, a start switch 83, a relay 88 comprising a magnetic coil 88a, holding circuit contacts 88d, fan motor contacts 88c, fan motor 46, burner circuit contacts 88b, a plug-in receptacle 54a for an auxiliary burner (not shown), an auxiliary burner system 93 and a high temperature limit switch 87. The off switch 82 has normally-closed contacts. The start switch 83 has normally-open contacts. The magnetic relay 88 contains normally-open contacts 88b through 88d which close when the magnetic coil 88a is energized. The fan motor 46 and the auxiliary portable heating unit 93 preferably contain thermal overload protection (not shown). The plug-in receptacle 54a and all associated wiring with the unit is preferably a three-wire ground system. The high temperature limit switch 87 is set to provide high temperature protection to the motor 46 and other electrical wiring and to provide protection to the tubing 61 so it will not melt. Switch 87 also provides a means of limiting the temperature an individual may be exposed to at the discharge holes in the flexible tube 61.

Referring to FIG. 5 for the following operation sequence: prior to starting the unit, the plug 31a of burner system 20 used must be plugged into the fan unit's plug-in receptacle 54a below the control box 56 to insure that the heat distribution unit control circuit will provide the necessary control functions and safety protection. When the burner system 20 is plugged into the receptacle 54a and the power cord 53 for the fan unit 40 is connected to a power source 81, power will be supplied to the series circuit including off switch 82, magnetic coil 88a and start switch 83. Since start switch 83 is open, the magnetic coil 88a is not energized, all contacts 88b-88d in the magnetic relay are open and no power is coupled to the burner unit 20 or the fan motor 40. When the start switch 83 is pushed closed, its contacts are mechanically closed and power from source 81 is supplied to the magnetic coil 88a. When the coil 88a is energized, all contacts 88b-88d in the magnetic relay 88 are closed. There is now power to the burner unit 93, the fan motor 46 and to the holding circuit contacts 88d. When the start switch 83 is released, its contacts open and power from source 81 is now supplied to the magnetic coil 88a through off switch 82, limit switch 87 and contact pair 88d. Note that both the fan 46 and the burner unit 93 start at the same time. This provides protection to the fan unit 46 because there is no large heat buildup prior to starting the fan 46. Now the fan 46 and burner unit 93 operate until one of the following conditions exist:

First, if the off switch 82 is pushed, its normally-closed contacts open and power to the magnetic coil 88a is interrupted. This causes all contact pairs 88b-88d to open and the burner 93 and fan 46 will shut off.

Second, if the thermal overload protection (not shown) in the fan motor 46 allows the fan motor 46 to shut off, the temperature within the fan distribution unit 40 will now exceed the desired limit and the high temperature limit switch 87 will open, interrupting power to the magnetic coil 88a. This, again, causes contacts 88b-88d to open and the burner unit 93 and fan motor 46 are shut off.

Third, if a burner unit 20 of too large a capacity or if, due to existing conditions the temperature rise within the fan distribution unit 40 rises above the desired high limit temperature setting (in normal use, the temperature is set at 200° F.,) the high temperature limit switch 87 will open, interrupting power to the magnetic coil 88a allowing the contacts 88b-88d to open. This will again shut off the burner unit 93 and the fan unit motor 46.

If the heat unit 20 and the fan unit 40 shut off because of the high temperature limit switch 87, the heat unit 20 must be cooled down prior to starting. This normally takes a brief period of time. If the start button 83 is pushed and only the burner element 93 starts, then the problem is in the fan motor circuit 83 (not shown) of the heat distribution unit 20. The motor (not shown) in the heater unit 20 must be allowed to cool. This may take a relatively long period of time due to the mass of the motor. The failure could also be the result of thermal overload protection or a motor failure for any number of reasons. The most common failure should be the overload protection. If it is a thermal overload protection problem, the fan in the heat distribution unit 20 will not operate and the stop button 82 should be operated. However, if stop button 82 is not operated, the high temperature limit switch 87 opens, causing the burner unit 93 to shut off. This is why it is absolutely necessary that the burner unit 20 be plugged into the receptacle provided on the heat distribution unit's control panel 54 to provide the necessary protection. If further tests of the fan unit motor 46 are desired, the burner plug 31a should be unplugged from receptacle unit 54, making it possible to notice immediately if the fan motor plug 46 will not operate, with no interference from the burner unit 20.

A latitude of modification, change and substitution is intended in the foregoing disclosure and, in some instances, some features of the invention will be employed without a corresponding use of other features. Accordingly, it is appropriate that the appended claims be construed broadly in a manner consistent with the spirit and scope of the invention herein.

What is claimed is:

1. Portable heating apparatus comprising:
    a portable heater unit having an inlet end for receiving air at ambient temperature and an outlet end;
    first fan means for drawing air into said inlet end and for delivering air at a predetermined low velocity through said outlet end;
    heating means for heating the ambient air moving between said inlet end and said outlet end to an elevated temperature well above the temperature of the ambient air;
    portable inlet hood means including supporting means for supporting and maintaining said portable inlet hood means closely spaced from said outlet end for simultaneously receiving substantially all of the air at said elevated temperature delivered from the outlet end of said portable heating unit as well as ambient air in the region of the outlet end of said portable heating unit and the inlet hood means;
    said portable inlet hood means further including a small inlet and a larger outlet; second fan means positioned within said portable inlet hood means for drawing heated air from the outlet end of said portable heating unit and ambient air into said inlet hood means and for substantially homogeneously mixing said ambient air and said heated air to a temperature level between said elevated temperature and the temperature of said ambient air and for delivering the homogeneously mixed air at a predetermined high velocity through the outlet of said fan chamber;

an elongated flexible collapsible tube capable of assuming a substantially annular shape when inflated and having a first open end and a second closed end;

the first end of said tube communicating with the outlet of said fan chamber; and said collapsible tube having openings at spaced intervals along said tube for emitting high velocity jets of heated air, whereby the mixture of ambient air and air at said elevated temperature in said fan chamber lowers the temperature of the high velocity jets of heated air emitted from the openings in said collapsible tube to prevent persons standing in the path of such air jets from being burnt while at the same time providing a desirable warming effect to the portions of the body positioned in said jets.

2. The portable heating apparatus of claim 1 wherein said heater unit further includes a wheeled carriage and handle means to facilitate the transportability of said heater unit, said wheeled carriage including means for supporting the heater unit in the operating position after it is wheeled to the desired location.

3. The portable heating apparatus of claim 1 wherein said fan chamber further includes a wheeled carriage and handle means to facilitate the transportability thereof, said wheeled carriage including means for supporting the fan chamber in the operating position after it is wheeled to the desired location.

4. The portable heating apparatus of claim 1 wherein said inlet hood comprises a hollow shell having a circular shaped inlet opening tapering outwardly to a larger square-shaped opening communicating with the inlet of said fan chamber.

5. The portable heating apparatus of claim 4 further comprising a protective screen positioned in said inlet hood to prevent debris and other solid foreign material from entering into the interior of said fan chamber.

6. The apparatus of claim 1 wherein the openings in said collapsible tube are arranged at a twelve o'clock orientation.

7. The apparatus of claim 1 wherein the openings in said collapsible tube are arranged at a two o'clock orientation.

8. The apparatus of claim 1 wherein the openings in said collapsible tube are arranged at a four o'clock orientation.

9. The apparatus of claim 1 wherein said collapsible tube is formed of a fiber reinforced plastic material.

10. The apparatus of claim 9 wherein said plastic material is polyolefin.

11. The apparatus of claim 1 wherein the closed end of said collapsible tube is provided with an eyelet;

weight means comprised of a closed bag of flexible material containing a heavy pulverized material; and means securing said bag to said eyelet to hold down the free end of said collapsible tube.

12. The apparatus of claim 1 further comprising control means for operating said apparatus comprising; first switch means for selectively initiating coupling of electrical power from an electric power source to said control means;

second switch means for selectively initiating de-coupling of electrical power from said control means; and said control means further including circuit means for coupling electric power to said portable heating unit and said motor means when said first switch means is operated and for de-coupling electric power from said heating unit and said motor means when said second switch means is operated.

13. The apparatus of claim 12 further comprising switching means responsive to a predetermined temperature level in said fan chamber for decoupling said second fan means and said portable heating unit from electrical power.

14. The apparatus of claim 13 wherein said control means comprises contact means coupling said second switch means and the electrical power to said sensing means when said control means is energized.

15. The apparatus of claim 12 wherein said control means is mounted upon said inlet hood means;

a first power cord for coupling said control means to a source of power;

said control means having a receptacle;

said portable heater unit having a second power cord arranged to be coupled to said receptacle; and said control means controlling said receptacle for coupling power to said portable heater unit.

16. The apparatus of claim 1 further comprising venturi means arranged between said inlet hood means outlet and said second fan means for increasing the velocity of the mixed heated air passing through said venturi means and introduced into said tube.

17. The apparatus of claim 1 wherein the inlet end of said hood means is larger than the outlet end of said portable heater unit to enable ambient air to enter said hood means inlet end in the region surrounding said portable heater outlet end.

18. The apparatus of claim 17 wherein the centers of said portable heater outlet end and said hood inlet opening are substantially in alignment and are arranged adjacent to one another to assure delivery of substantially all of said heated air into said hood inlet end.

19. Portable heating apparatus comprising:

a portable heater unit having an inlet end for receiving air at ambient temperature and an outlet end;

first fan means for drawing air into said inlet end and for delivering air at a predetermined low velocity through said outlet end;

heating means for heating ambient air moving between said inlet end and said outlet end to an elevated temperature;

inlet hood means spaced from said outlet end for simultaneously receiving air at said elevated temperature from the outlet end of said heating unit and ambient air in the region of the outlet end of said heating unit and the inlet hood means;

a fan chamber forming a portion of said inlet hood means and having an inlet communicating with said inlet hood means and an outlet including second fan means positioned adjacent to said inlet hood means for drawing heated air from the outlet end of said heating unit and ambient air into said inlet hood means and for substantially homogeneously mixing said ambient air and said heated air to a temperature level between said elevated temperature and the temperature of said ambient air and for delivering the homogeneously mixed air at a predetermined high velocity through the outlet of said fan chamber;

an elongated flexible collapsible tube capable of assuming a substantially annular shape when inflated and having a first open end and a second closed end;

the first end of said tube communicating with the outlet of said fan chamber;

said collapsible tube having openings at spaced intervals along said tube for emitting high velocity jets of heated air, whereby the mixture of ambient air and air at said elevated temperature in said fan chamber lowers the temperature of the high velocity jets of heated air emitted from the openings in said collapsible tube to prevent persons standing in the path of such air jets from being burnt while at the same time providing a desirable warming effect to the portions of the body positioned in said jets;

motor means for rotating said second fan means;

bracket means for supporting said motor at a central location within said fan chamber; and substantially cone-shaped deflector means positioned upstream relative to said motor means whereby said deflector means deflects air entering into the inlet opening of said inlet hood means away from said motor means and toward said second fan means to prevent said motor means from overheating due to direct contact with the heated air from said heating means.

* * * * *